US010009339B2

(12) United States Patent
Ghetie et al.

(10) Patent No.: US 10,009,339 B2
(45) Date of Patent: Jun. 26, 2018

(54) SYSTEM, APPARATUS AND METHOD FOR SECURELY PROTECTING A PROCESSOR IN TRANSIT

(71) Applicant: Intel Corporation, Santa Clara, CA (US)

(72) Inventors: Sergiu D. Ghetie, Hillsboro, OR (US); Neeraj S. Upasani, Portland, OR (US); Vijaya K. Boddu, Pleasanton, CA (US); Kenneth Young, Cayce, SC (US); Daniel G. Borkowski, Lunenburg, MA (US); Won Lee, Hillsboro, OR (US); Shahrokh Shahidzadeh, Portland, OR (US); Samie B. Samaan, West Linn, OR (US)

(73) Assignee: Intel Corporation, Santa Clara, CA (US)

( * ) Notice: Subject to any disclaimer, the term of this patent is extended or adjusted under 35 U.S.C. 154(b) by 154 days.

(21) Appl. No.: 15/086,214

(22) Filed: Mar. 31, 2016

(65) Prior Publication Data

US 2017/0289129 A1 Oct. 5, 2017

(51) Int. Cl.
*H04L 29/06* (2006.01)
*G06F 3/06* (2006.01)
*G06K 19/07* (2006.01)
*G06F 21/57* (2013.01)

(52) U.S. Cl.
CPC .......... *H04L 63/083* (2013.01); *G06F 3/0623* (2013.01); *G06F 3/0652* (2013.01); *G06F 3/0673* (2013.01); *G06F 21/575* (2013.01); *G06K 19/0723* (2013.01)

(58) Field of Classification Search
CPC ... H04L 63/083; G06F 3/0623; G06F 3/0652; G06F 3/0673; G06F 21/575; G06K 19/0723
USPC ........................................................... 726/7
See application file for complete search history.

(56) References Cited

U.S. PATENT DOCUMENTS

| 8,667,580 B2* | 3/2014 | Bhatt ..................... G06F 21/575 380/28 |
| 2003/0069815 A1* | 4/2003 | Eisenberg .............. G06Q 10/10 705/32 |
| 2005/0114690 A1* | 5/2005 | Rodriguez ........... G06Q 10/087 726/27 |
| 2006/0107320 A1* | 5/2006 | Bhatt .................... G06F 21/575 726/22 |

(Continued)

OTHER PUBLICATIONS

IMPINJ, "Introducing Monza X Chips," 2012, 2 pages.
IMPINJ, "Impinj® Monza® X-2K Dura Datasheet," Rev 1.51 Mar. 24, 2014, 30 pages.

*Primary Examiner* — Michael S McNally
(74) *Attorney, Agent, or Firm* — Trop, Pruner & Hu, P.C.

(57) ABSTRACT

In one embodiment, a processor includes: a first die including at least one processor core to execute instructions and a non-volatile storage to store an identifier to be provisioned into the processor during manufacture; a second die to couple to the first die, the second die including a wireless circuit and a second non-volatile storage; and a wireless interface to couple to the second die to enable wireless communication with a wireless device. The processor may be disabled if the identifier is not stored in the second non-volatile storage. Other embodiments are described and claimed.

17 Claims, 7 Drawing Sheets

(56) References Cited

U.S. PATENT DOCUMENTS

2008/0289030 A1* 11/2008 Poplett .................. G06F 21/31
　　　　　　　　　　　　　　　　　　　　　　726/15

* cited by examiner

SYSTEM, APPARATUS AND METHOD FOR SECURELY PROTECTING A PROCESSOR IN TRANSIT

TECHNICAL FIELD

Embodiments relate to providing security protection to a processor or other integrated circuit.

BACKGROUND

Many electronic devices, and even their constituent components, such as processors, are high value assets, which can make them targets for theft during transit from the time they leave a manufacturing facility and during transportation through the various legs of a supply chain until they reach an end user/customer site. While various security considerations such as shipment in locked storage containers are used, concerns remain. For example, delivery personnel can be targeted for attempt to physically gain possession of the electronic devices. At this point, there is no protection besides a lock on a shipping container, which can easily be subverted.

DETAILED DESCRIPTION

In various embodiments, electronic device theft may be prevented by providing a capability to lock the device prior to transit, and then enable its unlocking after safe delivery to an intended destination is confirmed. While example embodiments described herein are in connection with processors and more particularly server processors, understand that embodiments may be applied to a wide variety of devices. With this ability, devices can be locked while in transit, such that they do not boot or otherwise operate when locked. Locked devices will be useless, reducing their street value to near zero. This arrangement may thus lead to a secure supply chain, protecting assets as well as the life of the personnel involved in shipment of these products.

At a high level, a processor (e.g., a central processing unit (CPU)) is provided with a random password. Presence of the password allows the processor to boot. Absence of the password locks the CPU and prevents a system e.g., server, from booting. Locking and unlocking of the CPU in an unpowered state is allowed via a radio frequency (RF) interface, even when the CPUs are not socketed. All CPUs in trays/boxes in shipment can be locked and unlocked simultaneously via the RF interface. During transit, the sender will extract the password stored in an RF identification (RFID) tag of a processor, and the processor is locked. Extracted passwords belonging to CPUs in a shipment can be sent to a receiver in an encrypted fashion via a given secure digital communication interface like a cloud-based infrastructure, for example. In turn, a verified receiver of the processor such as a customer can unlock the CPUs using the received passwords.

Embodiments may thus provide a low-cost solution to provide transit security, while ensuring that the various operations performed in locking and unlocking the processor, as well as verifying the presence of a locked or unlocked condition, occur using processor-internal hardware, software and/or firmware, to avoid external exploits. This is the case, as the entire solution resides within the CPU package with no external entities like basic input/output system (BIOS) or so forth. Using an embodiment as described herein, a great amount of security may be provided, as a brute-force attack to guess a password would require billions of years.

Figure 1:
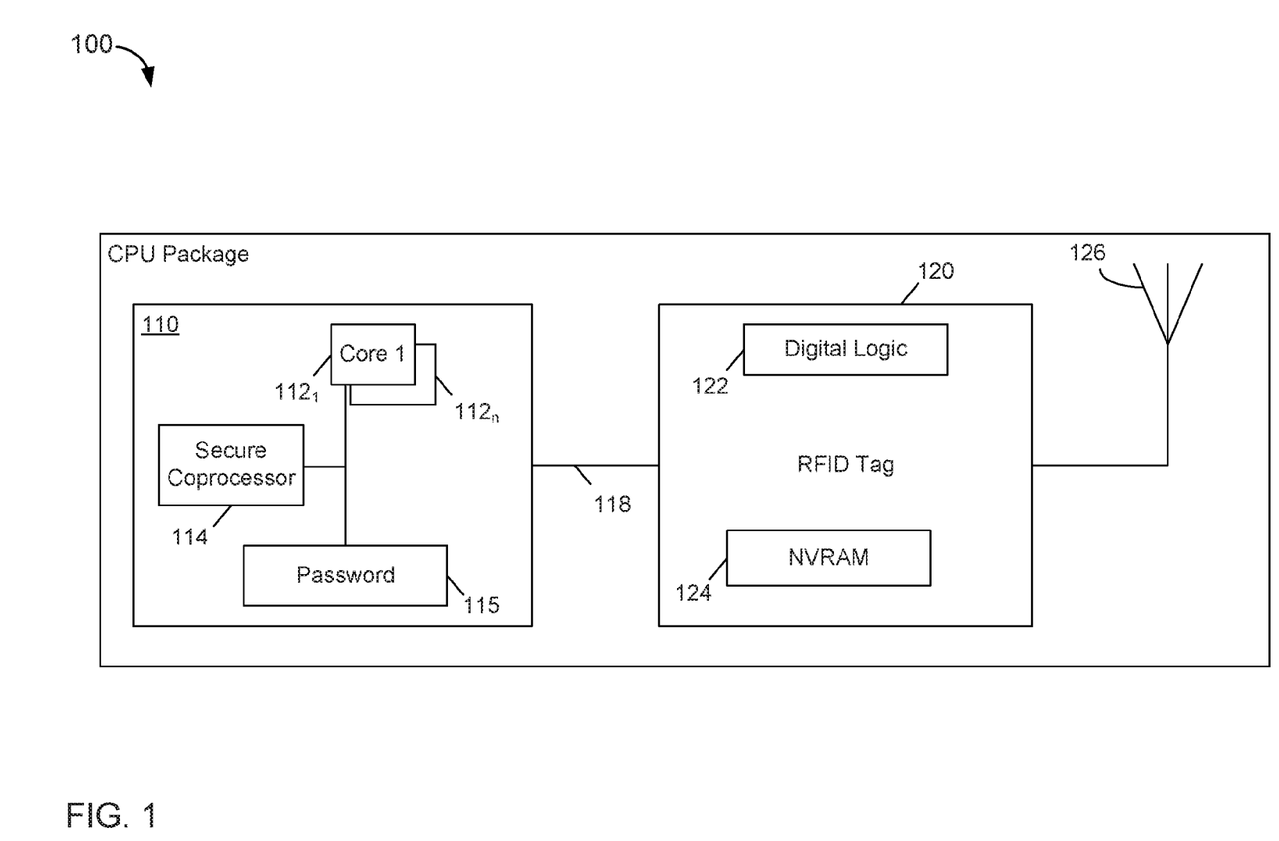
FIG. 1 is a block diagram of a processor in accordance with an embodiment of the present invention.

Referring now to FIG. 1, shown is a block diagram of a processor in accordance with an embodiment of the present invention. As shown in FIG. 1, processor 100 may be any type of central processing unit (CPU), system on a chip (SoC) or any other high value processor-based integrated circuit. As illustrated, processor 100 may be implemented as a multi-die package. Of course understand that in other embodiments, a processor can be implemented on a single semiconductor die.

Processor 100 includes a first die 110, which may be a CPU die including one or more processor cores $112_1$-$112_n$. Of course other related circuitry may be present in a given implementation. At a minimum, die 110 may include one or more levels of memory, such as cache memory hierarchy. In addition, die 110 may include one or more communication interfaces to communicate with other circuitry within processor 100 as well as external components. In the illustrated embodiment, to enable transit-based protection as described herein, die 110 further includes a non-volatile storage 115 in which a password or other secure identifier can be stored. As will be discussed herein, non-volatile storage 115 may be implemented as a fuse storage or other non-volatile memory. To enable the transit-based protection described herein, a secure coprocessor 114, which may be implemented as a hardware security logic, may further be present in die 110. In various embodiments, secure coprocessor 114 may be a separate processor circuit to execute in a secure environment, such as a trusted execution environment (TEE), such that it executes in isolation from cores 112. Of course in other embodiments, the security mechanisms described herein can be implemented using cores 112.

As illustrated, first die 110 couples to a second die 120 via an interface 118. In an embodiment, interface 118 may be implemented as an I²C interface. Of course in other embodiments, a different interconnection (such as a system management bus (SMBus)) may couple the dies. Second die 120 is implemented as an RFID tag 120. RFID tag 120 may include a digital logic 122, which may be a relatively simple processing circuit to enable RF-based communication and to store information in a non-volatile storage 124 of the RFID tag. In an embodiment, non-volatile storage 124 may be implemented as a non-volatile random access memory (RF-NVRAM). As will be described herein, storage of the same password or other identifier as stored in die 110 within non-volatile storage 124 may enable transit-based protection as described herein.

To enable communication with external entities, such as via an RF reader/writer, RFID tag 120 is coupled to an antenna 126, which may be an internal antenna implemented within or coupled to a package of processor 110. In various embodiments, RFID tag 120 may be a passive device. That is, it is powered by a magnetic field created by a read or write communication from an associated RFID reader/writer to enable read and write operations with non-volatile storage 124, even when the corresponding processor 100 is powered off (and even when it is in an inventory state, e.g., present in a warehouse facility).

In various embodiments, RFID tag 120 may be a passive ultrahigh frequency (UHF) RFID device having embedded RF-NVRAM that can be written from two different interfaces: interface 118 when in a powered state; and an RF interface when in an unpowered state. It is a passive device, which means that it can be read/written without an external voltage supply to the chip, as energy from a RF gun can be used to perform read/write transactions to the non-volatile storage. In an embodiment, a user uses the RF channel to read/write to the RF-NVRAM with the RF gun (which may operate in an 860-960 MHz range). Understand while shown at this high level in the embodiment of FIG. 1, many variations and alternatives are possible.

As discussed above, embodiments provide transit-based protection by associating a common identifier, such as password, key, or other value with two different components of a processor (e.g., two different die of the processor) to enable the processor to be locked when these two values do not match. To this end, during a manufacturing process, a processor may be provisioned with this secure identifier, which can be stored as a password into the fuse-based storage of the CPU die.

Figure 2:
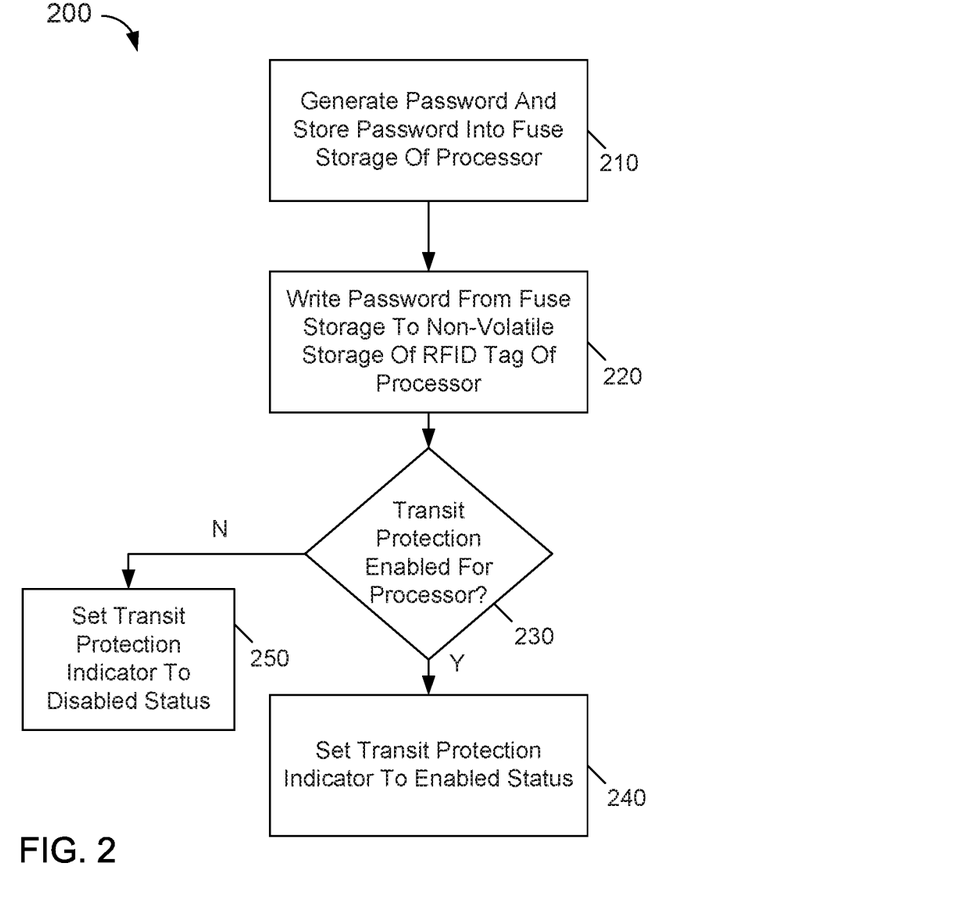
FIG. 2 is a flow diagram of a manufacturing process in accordance with an embodiment of the present invention.

Referring now to FIG. 2, shown is a flow diagram of a manufacturing process in accordance with an embodiment of the present invention. As shown in FIG. 2, method 200 may be used during manufacture of a processor. Specifically, during programming of a processor die, a password may be generated and stored into a fuse storage or other non-volatile storage of the processor (block 210). For example, a manufacturing tool can generate a random number to act as this password. Although the scope of the present invention is not limited in this regard, in an embodiment this random value may be generated according to hardware such as a pseudo-random number generator, a random number generator, or any other source of entropy to provision the password. In one embodiment, the password may be a 64-bit value, although other sizes of course are possible. Note that the writing of this password into the fuse storage may occur in conjunction with a programming portion of the manufacturing process in which various configuration values and other information are programmed into the processor. Such programming may occur when the die is part of a wafer being processed, or after the die is cut from the wafer and packaged.

Still with reference to FIG. 2, control next passes to block 220 where this password also may be stored into a non-volatile storage of the co-located RFID tag. Understand that this programming may be performed by the manufacturing tool, which causes the CPU die to communicate the password, via an I²C interface in an embodiment, to the RFID tag for storage in the non-volatile storage of the RFID tag. Next it can be determined whether transit protection is to be enabled for the processor (diamond 230). This is the case, as in some embodiments this transit protection feature may be desired to be enabled or disabled, e.g., for given customers, processor types, transit situations and so forth.

If it is determined that transit protection is to be enabled for this processor, control passes to block 240 where a transit protection indicator may be set to an enabled status. In an embodiment, this indicator may be implemented as a given bit of a configuration register of the processor set to a first value (e.g., logic 1) to indicate that transit protection as described herein is to be enabled. With such transit protection enabled, without a proper authentication according to an embodiment, the processor is to remain in a locked status and be prevented from operation. Otherwise if it is determined at diamond 230 that transit protection is not to be enabled, control passes to block 250 where this transit protection indicator can be set to a disabled status (e.g., set to a logic 0 value). Understand while shown at this high level in the embodiment of FIG. 2, many variations and alternatives are possible.

During transit, the sender will extract the password from the RFID tag and ship the processor in a locked state. In an embodiment, a list of tag IDs and corresponding extracted passwords belonging to the processors in a shipment can be sent to the receiver via a different secure digital communication interface like a cloud-based infrastructure, for example.

Figure 3:
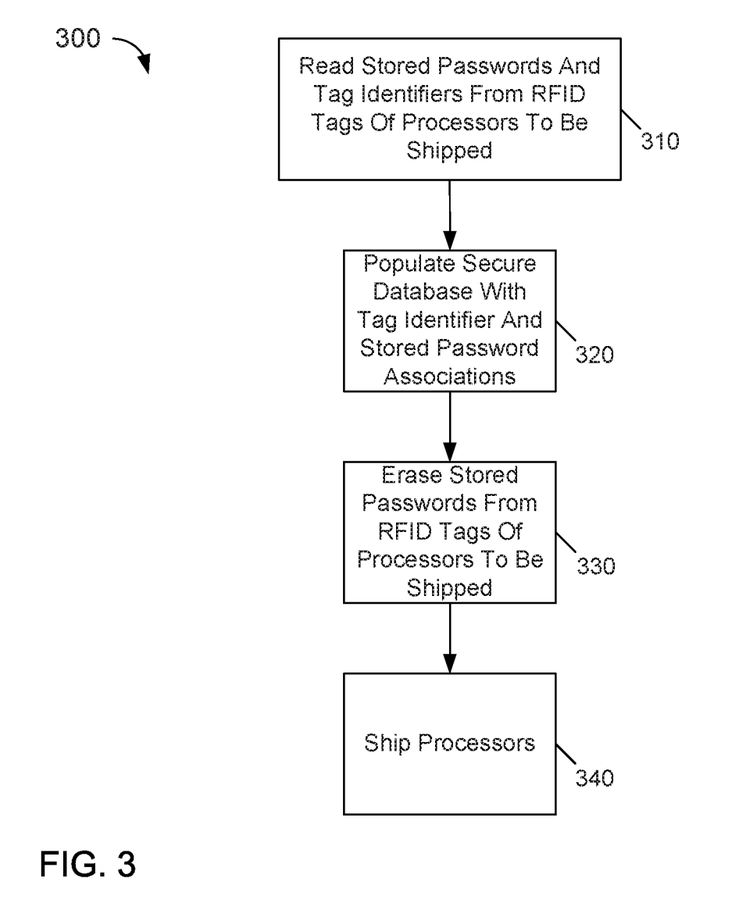
FIG. 3 is a block diagram of a method of handling a protected processor in accordance with an embodiment.

Referring now to FIG. 3, shown is a block diagram of a method of handling a protected processor in accordance with an embodiment. Method 300 may be performed during preparation of a shipment of processors from, e.g., a warehouse facility of a processor manufacturer. As illustrated, method 300 begins by reading stored passwords and tag identifiers from the RFID tags of processors to be shipped (block 310). That is, each RFID tag may have a unique identifier stored in the non-volatile memory of the RFID tag by the RFID tag manufacturer. As an example, an RFID reader (or a combined reader/writer) can read these values by issuance of a transmission of a wireless read request. This read request may proceed iteratively through all processors located in a given proximity, by a collision-detection scheme. Understand that this read request may be issued while the processors are in a powered off state. Specifically the processors may be boxed in shipping packages at this time.

From the information read from the passive RFID tags, at block 320 a secure database may be populated with associations between tag identifiers and the stored passwords. As an example, the RFID reader can be in communication (e.g., wirelessly) with a protected database to store this information. Such database may be associated with a server computer of the manufacturing facility. In other cases, the secure database may be located at a remote cloud-based data center. In any event, such communication between the RFID reader and the secure database may be made via a secure communication path, e.g., after appropriate authentication of the RFID reader and user. Such secure channel may be created responsive to setting up of a secure session between the devices. In any case, this secure database may be arranged with a plurality of entries each including, at least, an RFID tag identifier to identify a particular RFID tag present in a given processor and its associated password. In some embodiments, additional information such as system serial number, RFID reader serial number, and geographic location, also may be stored in an entry. In addition, a history of transactions may also be captured to identify the last known activity that had occurred, for purpose of identifying unauthorized access and tampering of information.

Still with reference to FIG. 3, next at block 330 the stored passwords can be erased from the RFID tags of the processors to be shipped. In an embodiment, the RFID reader may issue an erase command to cause the stored passwords to be erased. In other embodiments, the erase operation can be implemented as a write command to write a predetermined value (e.g., all zeros or any other desired value (of course that is different than the previously stored password value)) to the password entry of the non-volatile storage of the RFID tag. In one embodiment, a single erase command may be communicated and performed by all processors in the proximity in a broadcast mode. In another case, unicast commands can be sent individually to the processors in seriatim. At this point the processors are locked, such that they cannot operate properly until the original password is re-associated with the RFID tag. Thus at this point, at block 340 the processors may be shipped, e.g., by a given shipping channel to a destination, such as an original equipment manufacturer (OEM) of one or more types of computing devices, such as smartphones, tablet computers, personal computers, server computers or so forth.

Figure 4:
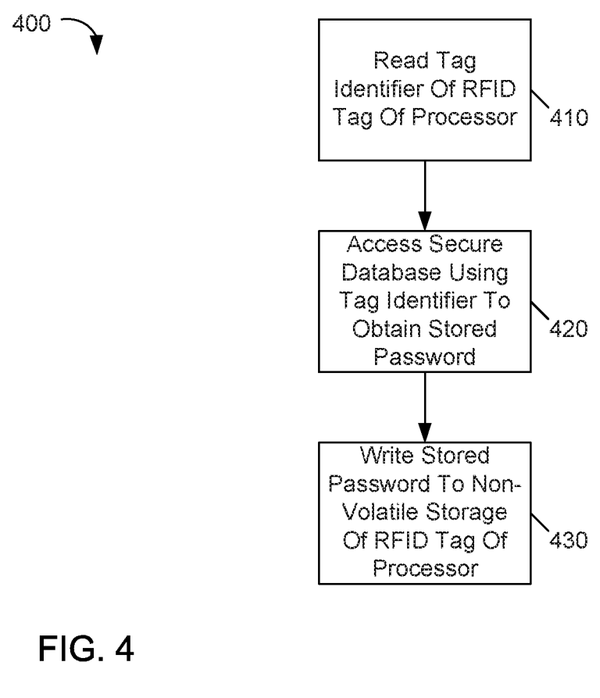
FIG. 4 is a flow diagram of a method in accordance with yet another embodiment of the present invention.

Referring now to FIG. 4, shown is a flow diagram of a method in accordance with yet another embodiment of the present invention. As shown in FIG. 4, method 400 may be performed by the OEM or other downstream entity to unlock a processor previously locked for transit protection. As seen, method 400 may begin at block 410 by reading a tag identifier of an RFID tag of a processor. As above, this reading of the tag identifier stored in the RFID tag may be by way of an RFID reader/writer. Then using this tag, at block 420 a secure database may be accessed to obtain a stored password that is associated with this tag identifier. Note that this secure database may be the same database populated by the processor manufacturer. In such embodiments, the processor manufacturer may enable the OEM to access the database, by way of allowing access to, e.g., a cloud-based storage having this database responsive to a successful authentication of the OEM. In other cases, the secure database created by the processor manufacturer (or portions reflecting a shipment) can be provided to the OEM in other manners, such as encrypted file transfer protocol (FTP) files, application programming interface (API) or ZIP files.

In any case, at block 430 this stored password associated with the transaction identifier can be written to the non-volatile storage of the RFID tag of the processor. Here, this write process may be performed by the RFID reader/writer by sending a write pulse. Note that in embodiments, this write process may be performed while the processor is in a powered off state, such as prior to incorporation of a processor into a given computing system. For example, method 400 may be performed during an on-boarding process, after delivery of a shipment of processors from the manufacturer to the OEM. By writing this stored password into the non-volatile storage of the RFID tag of the processor, the processor is thus unlocked and capable of normal operation, given that this newly stored password will match the password stored in the fuse storage of the CPU die of the processor. As an additional verification prior to restoring the password, the tag ID can be verified between the value in the cloud storage location and the physical RFID tag on the processor, to ensure that the physical RFID tag was not altered or changed.

In an embodiment, during a pre-boot environment, processor firmware (e.g., so-called pcode) reads the password from the RFID tag and tries to match it with the password stored in non-volatile storage of the processor. If the passwords match, then the firmware allows the boot process to continue. Otherwise it stops the processor from booting and hangs. This means that if the matching password is present in the RF-NVRAM of the RFID tag, the processor is unlocked, and if the password is deleted from the RF-NVRAM, it is locked.

Figure 5:
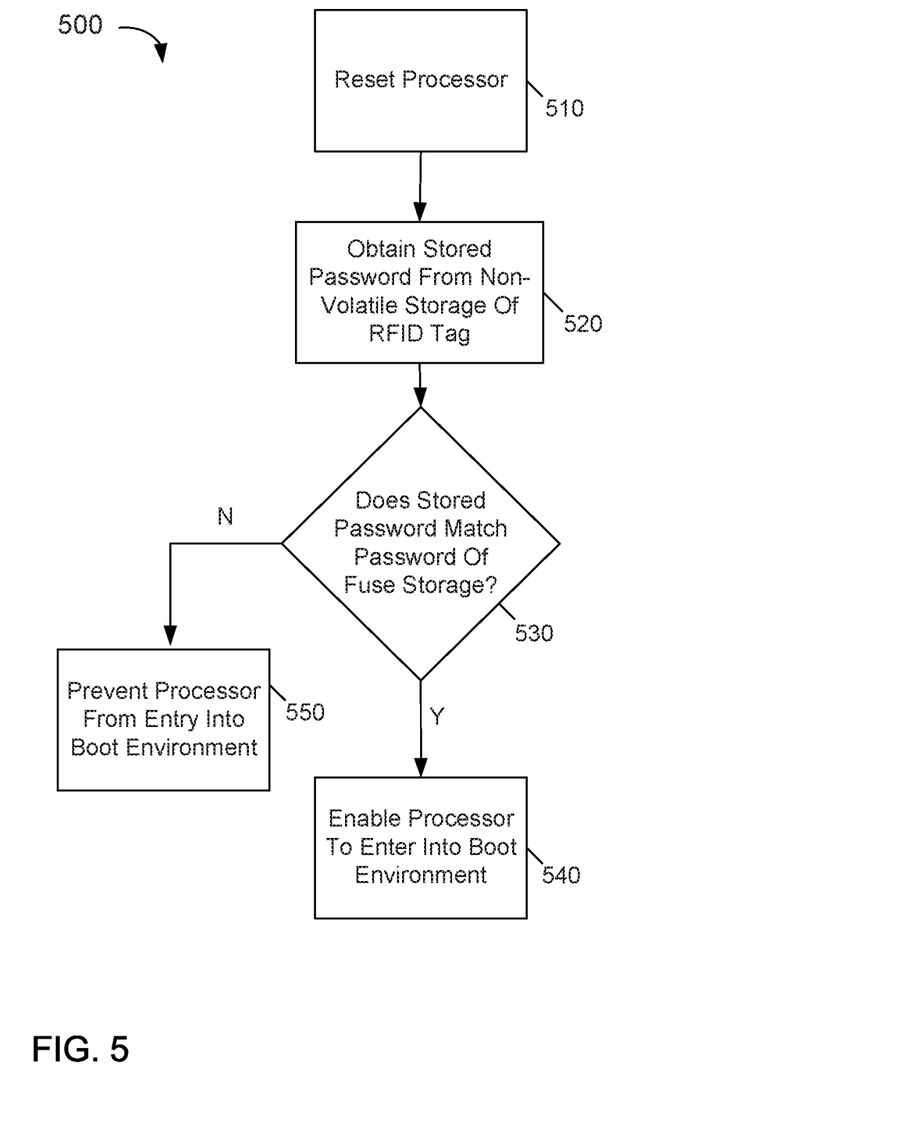
FIG. 5 is a flow diagram of an authentication method in accordance with an embodiment of the present invention.

Referring now to FIG. 5, shown is a flow diagram of an authentication method in accordance with an embodiment of the present invention. In various embodiments, authentication method 500 may be performed in a processor within a given system such as responsive to a reset or other powering on of the processor. In different implementations, method 500 may be performed by hardware, software and/or firmware and combinations thereof. In one particular instance, method 500 may be implemented by hard-coded firmware, e.g., stored in a read only memory (ROM) of the processor.

As illustrated, method 500 begins on reset of the processor (block 510), such as when a system is powered on. At block 520, the stored password may be obtained from the non-volatile storage of the RFID tag. More specifically, the CPU may issue a read request via the interface that couples the two die together to read this stored password, which may be stored in a predetermined location, such as at a predetermined address of the non-volatile storage of the RFID tag programmed into the CPU initialization firmware. Note that during normal operation method 500, the RFID tag may be powered by a given operating voltage received from an operating voltage rail of the processor. In some embodiments, the RFID tag may be configured to have its RF port(s) disabled when it is being powered by the operating voltage rail.

Still with reference to FIG. 5, next it can be determined whether the stored password matches the password present in the fuse storage of the CPU die (diamond 530). If so, the processor may be enabled to enter into a boot environment (block 540). That is, responsive to this determination of a match, it is thus established that the processor is unlocked and is available for normal operation. Note that in some cases, further operations in a pre-boot environment may occur responsive to this successful determination prior to entry into the boot environment.

Otherwise, if these values do not match, this may be an indication of an unauthorized user attempting to use the processor. As such, control passes to block 550 where the processor is prevented from entering into a boot environment. In some instances, a processor may take further actions when these password values do not match. Understand while shown at this high level in the embodiment of FIG. 5, many variations and alternatives are possible. For example, in some cases, upon successful receipt and authentication of a processor at a target of the distribution chain, a permanent unlock technique can be applied, where the processor is fused to boot without performing the above authentication protocol thereafter. In this way, a boot process can proceed more expeditiously.

Figure 6:
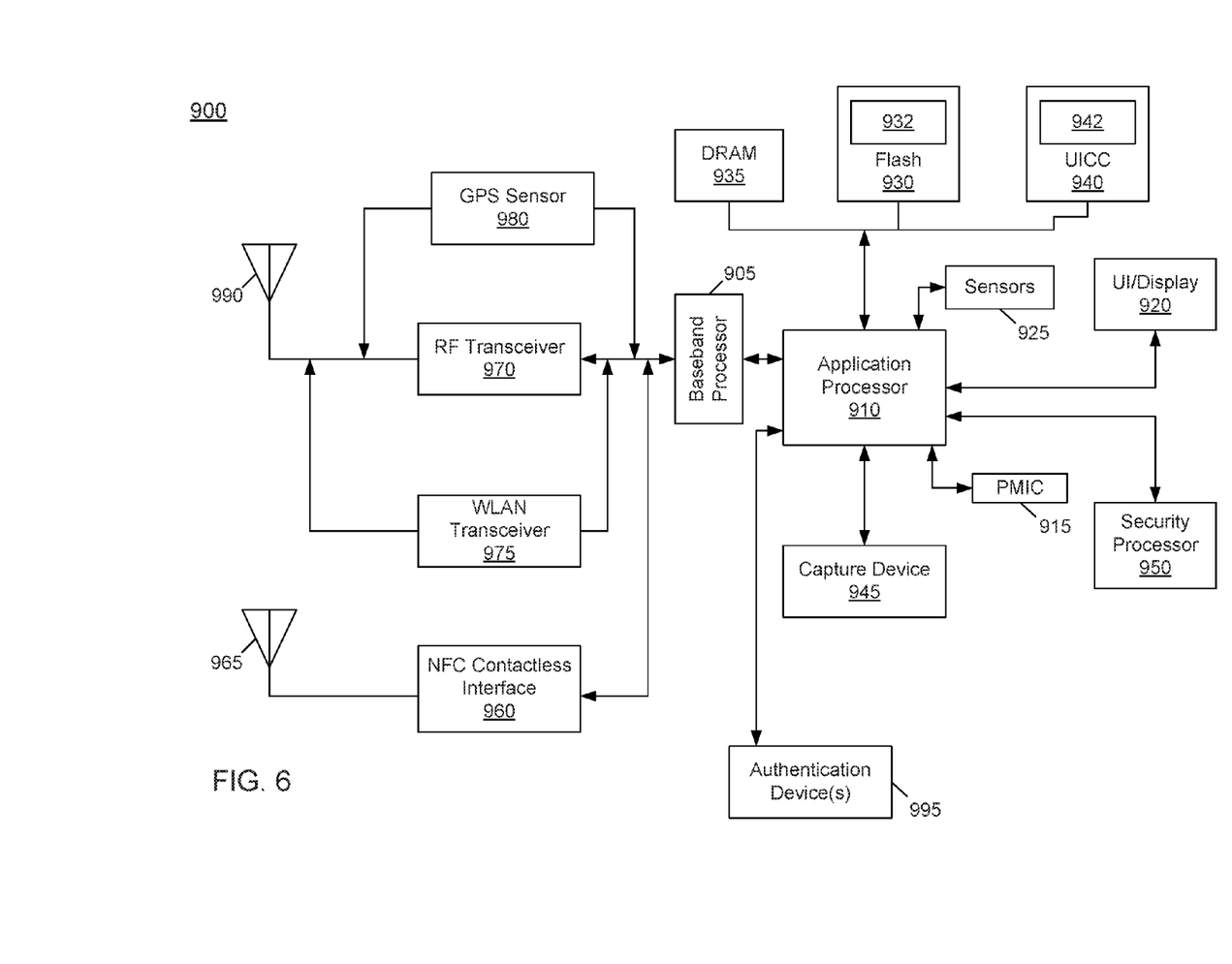
FIG. 6 is a block diagram of an example system with which embodiments can be used.

Transit protection as described herein can be used with processors or other integrated circuits for use in a wide variety of platforms. Referring now to FIG. 6, shown is a block diagram of an example system with which embodiments can be used. As seen, system 900 may be a smartphone or other wireless communicator or any other computing device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device, including the transit-based protection described herein, when enabled by the processor and/or system manufacturer. In an embodiment, runtime transit protection may be effected at least in part, responsive to processor firmware stored in a non-transitory storage medium of the processor.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which secrets and other sensitive information may be stored. As further seen, application processor 910 also couples to a capture device 945 such as one or more image capture devices that can record video and/or still images.

Still referring to FIG. 6, a universal integrated circuit card (UICC) 940 comprises a subscriber identity module, which in some embodiments includes a secure storage 942 to store secure user information. System 900 may further include a security processor 950 that may implement a TEE, and which may couple to application processor 910. Furthermore, application processor 910 may implement a secure mode of operation, such as Intel® Software Guard Extensions (SGX) to a given instruction set architecture, and circuitry for hosting of a TEE. In other embodiments, the transit protection may be performed within this TEE. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 6, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 7:
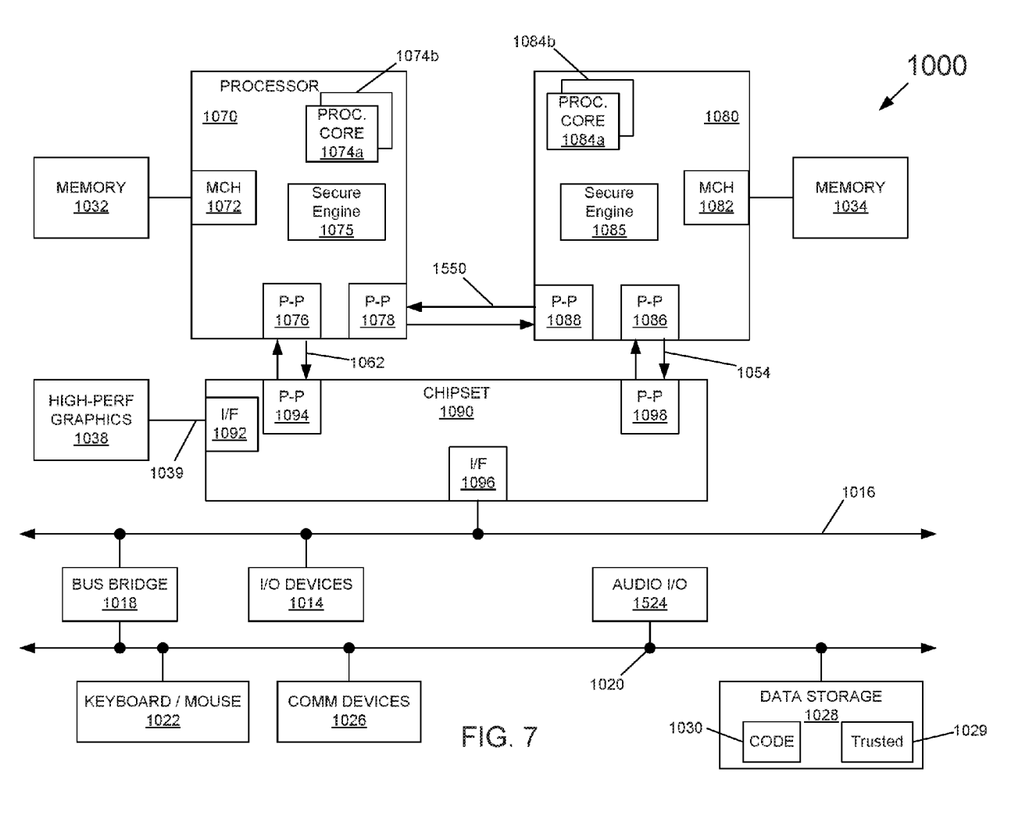
FIG. 7 is a block diagram of a system in accordance with another embodiment of the present invention.

Referring now to FIG. 7, shown is a block diagram of a system in accordance with another embodiment of the present invention. As shown in FIG. 7, multiprocessor system 1000 is a point-to-point interconnect system such as a server system, and which may include high value processors to be protected as described herein. More specifically, system 1000 includes a first processor 1070 and a second processor 1080 coupled via a point-to-point interconnect 1050. As shown in FIG. 7, each of processors 1070 and 1080 may be multicore processors such as SoCs, including first and second processor cores (i.e., processor cores 1074*a* and 1074*b* and processor cores 1084*a* and 1084*b*), although potentially many more cores may be present in the processors. In addition, processors 1070 and 1080 each may include a secure engine 1075 and 1085 to perform security operations, including the transit-based protection by way of the password matching technique described herein.

Still referring to FIG. 7, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 7, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 7, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 7, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Embodiments thus create a robust and secure supply chain for a processor manufacturer and its customers to prevent theft and associated threats against the life of the personnel involved in handling throughout a supply chain.

The following Examples pertain to further embodiments.

In Example 1, a processor comprises: a first die including at least one processor core to execute instructions and a non-volatile storage to store an identifier to be provisioned into the processor during manufacture; a second die to couple to the first die, the second die including a wireless circuit and a second non-volatile storage, where the processor is to be disabled if the identifier is not stored in the second non-volatile storage; and a wireless interface to couple to the second die to enable wireless communication with a wireless device.

In Example 2, the processor further comprises a security logic to obtain a stored identifier from the second non-volatile storage and determine if the stored identifier matches the identifier, and if so enable the processor, and otherwise disable the processor.

In Example 3, the security logic is to obtain the stored identifier responsive to execution of pre-boot firmware after reset of the processor.

In Example 4, the stored identifier is to be removed from the second non-volatile storage prior to delivery to a customer to lock the processor for transit.

In Example 5, the stored identifier is to be stored in the second non-volatile storage by the customer after the transit. The customer may be an OEM of a system including the processor, the customer to receive the stored identifier from a manufacturer of the processor via a secure link.

In Example 6, the security logic is to access the identifier from the non-volatile storage and communicate the identifier to the second die via a wired interface for storage in the second non-volatile storage as the stored identifier during the manufacture.

In Example 7, the identifier comprises a random password, the non-volatile storage comprising a fuse storage.

In Example 8, the second die comprises a RFID tag.

In Example 9, the RFID tag of Example 8 further comprises a tag identifier, where a manufacturing tool is to store association of the tag identifier and the stored identifier in a secure database.

In Example 10, the processor further comprises a configuration storage, the configuration storage to store a transit protection indicator to indicate whether the processor is to be enabled for transit protection, in which the processor is to be locked by removal of the identifier from storage in the second non-volatile storage.

In Example 11, a method comprises: in a pre-boot environment of a system, obtaining a stored identifier from a non-volatile storage of a RFID tag of a processor of the system; determining if the stored identifier matches an identifier stored in a first storage of the processor; responsive to a determination that the stored identifier matches the identifier, enabling the processor to enter into a boot environment; and responsive to a determination that the stored identifier does not match the identifier, preventing the processor from entering into the boot environment.

In Example 12, the method of Example 11 further comprises reading the stored identifier via a wired interface coupled between a first die including the first storage and a second die including the RFID tag.

In Example 13, the method of one or more of the above Examples further comprises storing firmware of the processor in a non-transitory storage medium.

In Example 14, the method of Example 11 further comprises obtaining the identifier from a fuse storage of the processor, the fuse storage comprising the first storage.

In Example 15, the identifier comprises a random password stored in the fuse storage during manufacture of the processor, the identifier separate from a unique identifier of the processor stored in another storage location of the processor, and further comprising de-provisioning the stored identifier from the non-volatile storage of the RFID tag prior to delivery of the processor to a customer.

In Example 16, a method comprises: storing a random number in a first storage location of a processor during a manufacturing programming of the processor; causing the random number to be stored in a non-volatile memory of a RFID device of the processor during the manufacturing programming; reading the random number and an identifier of the RFID device from the RFID device and storing an association of the identifier and the random number in an entry of a database; and thereafter erasing the random number from the non-volatile memory of the RFID tag to lock the processor.

In Example 17, the method further comprises storing a unique identifier in a second storage location of the processor during the manufacturing programming, the unique identifier separate from the random number.

In Example 18, causing the random number to be stored in the non-volatile memory of the RFID device comprises writing the random number from a first die of the processor including the first storage location to a second die of the processor including the RFID device via an interconnect coupled between the first die and the second die, while the processor is powered.

In Example 19, the method further comprises: reading the random number and the identifier from the RFID device using a RFID reader; establishing a first secure session between the RFID reader and the database; and sending the random number and the identifier to the database.

In Example 20, the method of Example 19 further comprises establishing a second secure session to send the association of the random number and the identifier to a destination entity to enable the destination entity to store the random number in the non-volatile memory of the RFID device after receipt of the processor.

In another example, a computer readable medium including instructions is to perform the method of any of the above Examples.

In another example, a computer readable medium including data is to be used by at least one machine to fabricate at least one integrated circuit to perform the method of any one of the above Examples.

In another example, an apparatus comprises means for performing the method of any one of the above Examples.

In Example 21, a processor comprises: core means for executing instructions; non-volatile storage means for storing an identifier to be provisioned into the processor during manufacture; wireless circuit means for executing instructions; second non-volatile storage means, where the processor is to be disabled if the identifier is not stored in the second non-volatile storage means; and wireless interface means for enabling wireless communication with a wireless device.

In Example 22, the processor further comprises security means for obtaining a stored identifier from the second non-volatile storage means and determining if the stored identifier matches the identifier, and if so enabling the processor, and otherwise disabling the processor.

In Example 23, the security means is to obtain the stored identifier responsive to execution of pre-boot firmware after reset of the processor.

In Example 24, the stored identifier is to be removed from the second non-volatile storage means prior to delivery to a customer to lock the processor for transit.

Understand that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
  a first die including at least one processor core to execute instructions and a non-volatile storage to store an identifier to be provisioned into the processor during manufacture;
  a second die to couple to the first die, the second die including a wireless circuit and a second non-volatile storage, wherein the processor is to be disabled if the identifier is not stored in the second non-volatile storage;
  a security logic to obtain a stored identifier from the second non-volatile storage and determine if the stored identifier matches the identifier, and if so enable the processor and otherwise disable the processor, wherein the stored identifier is to be removed from the second non-volatile storage prior to delivery to a customer to lock the processor for transit; and
  a wireless interface to couple to the second die to enable wireless communication with a wireless device.

2. The processor of claim 1, wherein the security logic is to obtain the stored identifier responsive to execution of pre-boot firmware after reset of the processor.

3. The processor of claim 1, wherein the stored identifier is to be stored in the second non-volatile storage by the customer after the transit, the customer comprising an original equipment manufacturer (OEM) of a system including the processor, the customer to receive the stored identifier from a manufacturer of the processor via a secure link.

4. The processor of claim 1, wherein the security logic is to access the identifier from the non-volatile storage and communicate the identifier to the second die via a wired interface for storage in the second non-volatile storage as the stored identifier during the manufacture.

5. The processor of claim 1, wherein the identifier comprises a random password, the non-volatile storage comprising a fuse storage.

6. The processor of claim 1, wherein the second die comprises a radio frequency identification (RFID) tag.

7. The processor of claim 6, wherein the RFID tag further comprises a tag identifier, wherein a manufacturing tool is to store association of the tag identifier and the stored identifier in a secure database.

8. The processor of claim 1, wherein the processor further comprises a configuration storage, the configuration storage to store a transit protection indicator to indicate whether the processor is to be enabled for transit protection, in which the processor is to be locked by removal of the identifier from storage in the second non-volatile storage.

9. At least one computer readable storage medium comprising instructions that when executed enable a system to:
  in a pre-boot environment of the system, obtain a stored identifier from a non-volatile storage of a radio frequency identification (RFID) tag of a processor of the system;
  determine if the stored identifier matches an identifier stored in a first storage of the processor, the identifier comprising a random password stored in the first storage during manufacture of the processor, the identifier separate from a unique identifier of the processor stored in another storage location of the processor, the stored identifier de-provisioned from the non-volatile storage of the RFID tag prior to delivery of the processor to a customer;
  responsive to a determination that the stored identifier matches the identifier, enable the processor to enter into a boot environment; and
  responsive to a determination that the stored identifier does not match the identifier, prevent the processor from entry into the boot environment.

10. The at least one computer readable storage medium of claim 9, further comprising instructions that when executed enable the system to read the stored identifier via a wired interface coupled between a first die including the first storage and a second die including the RFID tag.

11. The at least one computer readable storage medium of claim 9, wherein the instructions comprise firmware of the processor stored in a non-transitory storage medium.

12. The at least one computer readable storage medium of claim 9, wherein the instructions further enable the system to obtain the identifier from a fuse storage of the processor, the fuse storage comprising the first storage.

13. A method comprising:
  storing a random number in a first storage location of a processor during a manufacturing programming of the processor;
  causing the random number to be stored in a non-volatile memory of a radio frequency identification (RFID) device of the processor during the manufacturing programming;
  reading the random number and an identifier of the RFID device from the RFID device and storing an association of the identifier and the random number in an entry of a database; and
  thereafter erasing the random number from the non-volatile memory of the RFID device to lock the processor.

14. The method of claim 13, further comprising storing a unique identifier in a second storage location of the processor during the manufacturing programming, the unique identifier separate from the random number.

15. The method of claim 13, wherein causing the random number to be stored in the non-volatile memory of the RFID device comprises writing the random number from a first die of the processor including the first storage location to a second die of the processor including the RFID device via an interconnect coupled between the first die and the second die, while the processor is powered.

16. The method of claim 13, further comprising:
  reading the random number and the identifier from the RFID device using a RFID reader;
  establishing a first secure session between the RFID reader and the database; and sending the random number and the identifier to the database.

17. The method of claim 16, further comprising establishing a second secure session to send the association of the random number and the identifier to a destination entity to enable the destination entity to store the random number in the non-volatile memory of the RFID device after receipt of the processor.

* * * * *